(12) United States Patent
Cronin

(10) Patent No.: US 12,539,773 B2
(45) Date of Patent: Feb. 3, 2026

(54) SUPERCAPACITOR TO ELECTROCHEMICAL HYBRID SYSTEM WITH SMART SELF-DISCHARGE CAPABILITY

(71) Applicant: SUSTAINABLE ENERGY TECHNOLOGIES, INC., Wilmington, DE (US)

(72) Inventor: John Cronin, Wilmington, DE (US)

(73) Assignee: SUSTAINABLE ENERGY TECHNOLOGIES, INC., Wilmington, DE (US)

(*) Notice: Subject to any disclaimer, the term of this patent is extended or adjusted under 35 U.S.C. 154(b) by 517 days.

(21) Appl. No.: 18/090,292

(22) Filed: Dec. 28, 2022

(65) Prior Publication Data

US 2023/0211675 A1    Jul. 6, 2023

Related U.S. Application Data

(60) Provisional application No. 63/295,423, filed on Dec. 30, 2021.

(51) Int. Cl.
*B60L 15/20*    (2006.01)
*B60L 50/40*    (2019.01)
(Continued)

(52) U.S. Cl.
CPC ........... *B60L 15/2045* (2013.01); *B60L 50/40* (2019.02); *H02J 3/322* (2020.01); *H02J 7/00306* (2020.01);
(Continued)

(58) Field of Classification Search
CPC .................................................. B60L 15/2045
(Continued)

(56) References Cited

U.S. PATENT DOCUMENTS 5,642,270 A    6/1997    Green et al.
6,068,078 A    5/2000    Rau et al.
(Continued)

FOREIGN PATENT DOCUMENTS

CN    103192724    7/2013
CN    104057901    9/2014
(Continued)

OTHER PUBLICATIONS

Machine Translation CN103192724 reference of record (Year: 2020).

(Continued)

*Primary Examiner* — Yalkew Fantu
(74) *Attorney, Agent, or Firm* — Polsinelli LLP

(57) ABSTRACT

A method for powering an electric vehicle including an electrochemical battery and one or more supercapacitor batteries includes determining self-discharge rate data for the one or more supercapacitor batteries and, in response to the self-discharge rate data satisfying at least one threshold condition, notifying a user to charge the one or more supercapacitor batteries, otherwise performing operations including: measuring current within a first path connecting the electrochemical battery to the electric vehicle; storing data representing the measured current in a database; determining a current use pattern from stored current data in the database; and in response to the current use pattern satisfying a first switching condition, switching in the one or more supercapacitor batteries in place of the electrochemical battery.

20 Claims, 7 Drawing Sheets

(51) Int. Cl.
*H02J 3/32* (2006.01)
*H02J 7/00* (2006.01)
*H02J 7/34* (2006.01)

(52) U.S. Cl.
CPC ............ *H02J 7/0068* (2013.01); *H02J 7/345* (2013.01); *H02J 2207/50* (2020.01); *H02J 2310/48* (2020.01)

(58) Field of Classification Search
USPC ....................................................... 320/103
See application file for complete search history.

(56) References Cited

U.S. PATENT DOCUMENTS

| | | | |
|---|---|---|---|
| 7,548,894 B2 | 6/2009 | Fuji | |
| 8,080,971 B2 | 12/2011 | Bose et al. | |
| 8,120,295 B2 | 2/2012 | Soma et al. | |
| 8,193,761 B1 | 6/2012 | Singh | |
| 8,598,852 B2 | 12/2013 | Gilmore | |
| 8,881,832 B2 | 11/2014 | McMillon et al. | |
| 8,950,662 B2 | 2/2015 | Soborski | |
| 9,053,870 B2 | 6/2015 | Yu et al. | |
| 9,145,760 B2 | 9/2015 | McMillon et al. | |
| 9,169,719 B2 | 10/2015 | McMillon et al. | |
| 9,233,860 B2 | 1/2016 | Liu et al. | |
| 9,298,239 B2 | 3/2016 | Ishii et al. | |
| 9,318,271 B2 | 4/2016 | Fletcher et al. | |
| 9,379,546 B2 | 6/2016 | Li | |
| 9,519,942 B2 | 12/2016 | Soborski | |
| 9,940,572 B2 | 4/2018 | Soborski | |
| 10,061,958 B2 | 8/2018 | Voigt et al. | |
| 10,173,663 B1 | 1/2019 | Combs | |
| 10,235,597 B2 | 3/2019 | Voigt et al. | |
| 10,290,912 B2 | 5/2019 | Jiang et al. | |
| 10,380,601 B2 | 8/2019 | Soborski | |
| 10,596,909 B2 | 3/2020 | Choi et al. | |
| 10,700,597 B1 | 6/2020 | Eckhardt et al. | |
| 10,734,674 B2 | 8/2020 | Meshcheryakov et al. | |
| 11,407,327 B1 | 8/2022 | Kohn et al. | |
| 12,224,611 B2 | 2/2025 | Cronin | |
| 12,296,717 B2 | 5/2025 | Cronin | |
| 12,441,212 B2 | 10/2025 | Cronin | |
| 2004/0207205 A1 | 10/2004 | Kikuchi et al. | |
| 2005/0119806 A1 | 6/2005 | Nasr et al. | |
| 2005/0137764 A1 | 6/2005 | Alvarez-Troncoso et al. | |
| 2006/0250902 A1 | 11/2006 | Bender et al. | |
| 2007/0029986 A1 | 2/2007 | Nakamura et al. | |
| 2007/0258188 A1 | 11/2007 | Shiue et al. | |
| 2008/0129253 A1 | 6/2008 | Shiue et al. | |
| 2008/0161070 A1 | 7/2008 | Lee et al. | |
| 2009/0212626 A1 | 8/2009 | Snyder et al. | |
| 2010/0116574 A1 | 5/2010 | Gilmore | |
| 2010/0258369 A1 | 10/2010 | Ranier et al. | |
| 2010/0315046 A1 | 12/2010 | Trainor et al. | |
| 2011/0060565 A1 | 3/2011 | Sciarretta et al. | |
| 2012/0025614 A1 | 2/2012 | Taimela et al. | |
| 2012/0098496 A1 | 4/2012 | Jeong et al. | |
| 2012/0109408 A1 | 5/2012 | Siy et al. | |
| 2012/0126619 A1 | 5/2012 | Singh | |
| 2012/0227994 A1 | 9/2012 | Yang et al. | |
| 2012/0248870 A1 | 10/2012 | Coleman et al. | |
| 2012/0256583 A1 | 10/2012 | Davis | |
| 2012/0326668 A1 | 12/2012 | Ballantine et al. | |
| 2013/0106341 A1 | 5/2013 | Eaton et al. | |
| 2013/0264875 A1 | 10/2013 | Kaminsky et al. | |
| 2013/0271091 A1 | 10/2013 | Borkar | |
| 2013/0307489 A1 | 11/2013 | Kusch et al. | |
| 2013/0311529 A1 | 11/2013 | Liu et al. | |
| 2014/0117921 A1 | 5/2014 | Suomela | |
| 2014/0266059 A1 | 9/2014 | Li et al. | |
| 2014/0354195 A1 | 12/2014 | Li et al. | |
| 2015/0042157 A1 | 2/2015 | Chen et al. | |
| 2015/0047844 A1 | 2/2015 | McMillon et al. | |
| 2015/0069033 A1 | 3/2015 | Stockton et al. | |
| 2015/0210173 A1 | 7/2015 | Funabashi | |
| 2015/0303726 A1 | 10/2015 | Lei | |
| 2016/0013654 A1 | 1/2016 | Saha | |
| 2016/0156005 A1 | 6/2016 | Elliot et al. | |
| 2016/0176298 A1 | 6/2016 | Watson et al. | |
| 2016/0283842 A1 | 9/2016 | Pescianschi | |
| 2017/0076116 A1 | 3/2017 | Chen et al. | |
| 2017/0203850 A1 | 7/2017 | Wang et al. | |
| 2017/0267105 A1 | 9/2017 | Fratelli et al. | |
| 2017/0373513 A1 | 12/2017 | Aronov et al. | |
| 2018/0012197 A1 | 1/2018 | Ricci et al. | |
| 2018/0050602 A1 | 2/2018 | Aronov | |
| 2018/0123370 A1 | 5/2018 | Schartner | |
| 2018/0154779 A1 | 6/2018 | Chol et al. | |
| 2018/0201142 A1 | 7/2018 | Galin et al. | |
| 2018/0326861 A1 | 11/2018 | Poirier | |
| 2018/0375345 A1* | 12/2018 | Altemose | H02J 7/0048 |
| 2019/0061541 A1 | 2/2019 | Penilla et al. | |
| 2019/0097362 A1 | 3/2019 | Haba et al. | |
| 2019/0180949 A1 | 6/2019 | Liu et al. | |
| 2019/0312317 A1 | 10/2019 | Ballantine et al. | |
| 2020/0039356 A1 | 2/2020 | Montione | |
| 2020/0039454 A1 | 2/2020 | Hsieh et al. | |
| 2020/0164763 A1 | 5/2020 | Holme | |
| 2020/0271725 A1 | 8/2020 | Herring et al. | |
| 2020/0365336 A1 | 11/2020 | Luo et al. | |
| 2020/0376968 A1 | 12/2020 | Wang et al. | |
| 2020/0398696 A1 | 12/2020 | Stafl | |
| 2021/0126509 A1 | 4/2021 | Macaluso | |
| 2021/0175025 A1 | 6/2021 | Zhou et al. | |
| 2021/0203177 A1 | 7/2021 | Peng | |
| 2021/0221247 A1 | 7/2021 | Daniel et al. | |
| 2021/0291964 A1 | 9/2021 | Gilbert | |
| 2021/0319152 A1 | 10/2021 | Couture et al. | |
| 2021/0349155 A1* | 11/2021 | Srinivasan | G01R 31/389 |
| 2021/0376614 A1 | 12/2021 | Yang et al. | |
| 2022/0111759 A1* | 4/2022 | Ijaz | H01M 10/425 |
| 2022/0190629 A1 | 6/2022 | Varigonda et al. | |
| 2023/0107732 A1 | 4/2023 | Yamamoto et al. | |
| 2023/0127005 A1 | 4/2023 | Chen et al. | |
| 2023/0187954 A1 | 6/2023 | Cronin | |
| 2023/0191949 A1 | 6/2023 | Cronin | |
| 2023/0211674 A1 | 7/2023 | Cronin | |
| 2023/0211675 A1 | 7/2023 | Cronin | |
| 2023/0211676 A1 | 7/2023 | Cronin | |
| 2023/0211677 A1 | 7/2023 | Cronin | |
| 2023/0211691 A1 | 7/2023 | Cronin | |
| 2023/0213593 A1 | 7/2023 | Cronin | |
| 2023/0216323 A1 | 7/2023 | Cronin | |
| 2023/0216330 A1 | 7/2023 | Cronin | |
| 2023/0216331 A1 | 7/2023 | Cronin | |
| 2023/0234472 A1 | 7/2023 | Cronin | |
| 2023/0241984 A1 | 8/2023 | Cronin | |
| 2023/0378752 A1 | 11/2023 | Chen | |
| 2025/0253693 A1 | 8/2025 | Cronin | |
| 2025/0269765 A1 | 8/2025 | Cronin | |

FOREIGN PATENT DOCUMENTS

| | | |
|---|---|---|
| CN | 106252096 | 12/2016 |
| CN | 106252099 | 12/2016 |
| CN | 207453897 | 6/2018 |
| CN | 111216568 | 6/2020 |
| CN | 111490595 | 8/2020 |
| CN | 112290622 | 1/2021 |
| CN | 109983419 | 7/2022 |
| EP | 2 278 677 | 1/2011 |
| GB | 2554788 | 4/2018 |
| IN | 202041011809 | 2/2020 |
| KR | 20120131727 | 12/2012 |
| KR | 102247165 | 4/2021 |
| WO | WO 2014/107151 | 7/2014 |
| WO | WO 2018/041095 | 3/2018 |
| WO | WO 2018/106799 | 6/2018 |
| WO | 2020251854 A1 | 12/2020 |
| WO | PCT/US22/52805 | 12/2022 |
| WO | PCT/US22/53060 | 12/2022 |
| WO | PCT/US22/53955 | 12/2022 |
| WO | PCT/US22/54026 | 12/2022 |

(56) References Cited

FOREIGN PATENT DOCUMENTS

| | | |
|---|---|---|
| WO | PCT/US22/54029 | 12/2022 |
| WO | PCT/US22/54030 | 12/2022 |
| WO | PCT/US22/54184 | 12/2022 |
| WO | PCT/US22/54186 | 12/2022 |
| WO | PCT/US22/54320 | 12/2022 |
| WO | PCT/US22/54348 | 12/2022 |
| WO | PCT/US22/54357 | 12/2022 |
| WO | PCT/US2254388 | 12/2022 |
| WO | PCT/US23/12215 | 2/2023 |
| WO | WO 2023/114276 | 6/2023 |
| WO | WO 2023/114429 | 6/2023 |
| WO | 2023129520 A1 | 7/2023 |
| WO | 2023129521 A2 | 7/2023 |
| WO | 2023129522 A1 | 7/2023 |
| WO | 2023129614 A1 | 7/2023 |
| WO | 2023129616 A1 | 7/2023 |
| WO | 2023129695 A1 | 7/2023 |
| WO | 2023129718 A1 | 7/2023 |
| WO | 2023129724 A1 | 7/2023 |
| WO | 2023129741 A1 | 7/2023 |
| WO | WO 2023/150226 | 8/2023 |

OTHER PUBLICATIONS

Machine Translation CN111216568 reference of record (Year: 2020).
PCT Application No. PCT/US22/52805, International Search Report and Written Opinion dated Apr. 13, 2023.
PCT Application No. PCT/US22/53060, International Search Report and Written Opinion dated Apr. 4, 2023.
PCT Application No. PCT/US22/53955, International Search Report and Written Opinion dated Apr. 12, 2023.
U.S. Appl. No. 18/081,043, Office Action dated Mar. 13, 2024.
U.S. Appl. No. 18/081,043, John Cronin, Supercapacitor to Electrochemical Hybrid System, filed Dec. 14, 2022.
U.S. Appl. No. 18/082,25, John Cronin, Intelligent Hybrid Power System for Electrical Vehicles, filed Dec. 15, 2022.
U.S. Appl. No. 18/088,256, John Cronin, Supercapacitor to Electrochemical Hybrid Charging System, filed Dec. 23, 2022.
U.S. Appl. No. 18/088,663, John Cronin, Supercapacitor to Electrochemical Hybrid Top-Off System, filed Dec. 26, 2022.
U.S. Appl. No. 18/088,679, John Cronin, Supercapacitor to Electrochemical Hybrid System With Smart Self Discharge Capability, filed Dec. 26, 2022.
U.S. Appl. No. 18/088,680, John Cronin, Supercapacitor to Electrochemical Hybrid System With Failsafe Safety Capability, filed Dec. 26, 2022.
U.S. Appl. No. 18/091,822, John Cronin, Supercapacitpr to Electrochemical Hybrid System With Supercapacitor Testing Capability, filed Dec. 30, 2022.
U.S. Appl. No. 18/092,060, John Cronin, Supercapacitor to Electrochemical Hybrid System With Electrochemical Battery Testing Capability, filed Dec. 30, 2022.
U.S. Appl. No. 18/090,277, John Cronin, Supercapacitor to Electrochemical Hybrid System With Electrochemical Battery Management Capability, filed Dec. 28, 2022.
U.S. Appl. No. 18/091,521, John Cronin, Supercapacitor to Electrochemical Hybrid System With a Regenerative Charging Capability, filed Dec. 30, 2022.
U.S. Appl. No. 18/091,756, John Cronin, Supercapacitor and Lead-Acid Battery Hybrid Battery With Charging Capability, filed Dec. 30, 2022.
U.S. Appl. No. 18/105,108, John Cronin, Supercapacitor to Electrochemical Hybrid System With Dynamic Impedance Matching Capability, filed Feb. 2, 2023.
International PCT Application No. PCT/US22/54026 International Search Report mailed Apr. 18, 2023 (7 pages).
International PCT Application No. PCT/US22/54184 International Search Report mailed Apr. 18, 2023 (7 pages).
International PCT Application No. PCT/US22/54029 International Search Report mailed Apr. 18, 2023 (6 pages).
International PCT Application No. PCT/US22/54030 International Search Report mailed May 30, 2023 (10 pages).
International PCT Application No. PCT/US22/54357 International Search Report mailed Apr. 5, 2023 (21 pages).
International PCT Application No. PCT/US22/54388 International Search Report mailed Apr. 5, 2023 (19 pages).
International Application No. PCT/US22/54186 International Search Report mailed Mar. 20, 2023 (11 pages).
International Application No. PCT/US22/54320 International Search Report mailed Apr. 7, 2023 (9 pages).
International Application No. PCT/US22/54348 International Search Report mailed Apr. 7, 2023 (9 pages).
International Application No. PCT/US23/12215 International Search Report mailed May 9, 2023 (6 pages).
"200-MHz 16×16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.
"8×8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management—Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficiency Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloaded from Internet Feb. 21, 2023], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHZ Dual 2×2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.

(56) References Cited

OTHER PUBLICATIONS

"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacks," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-us/kb/hardware-topics/switching-architectures/understanding-tree-and-crosspoint-matrix-architectures.
U.S. Appl. No. 18/082,425, Office Action dated May 21, 2024.
U.S. Appl. No. 18/088,679, Office Action dated May 19, 2025.
U.S. Appl. No. 18/090,277, Office Action dated Feb. 28, 2025.
U.S. Appl. No. 18/091,756, Office Action dated Sep. 4, 2025.
U.S. Appl. No. 18/105,108, Office Action dated May 29, 2025.
PCT Application No. PCT/US22/53060, International Preliminary Report on Patentability dated Jun. 27, 2024.
Docket No. SETI-018PCT, PCT Application No. PCT/US22/53955, International Preliminary Report on Patentability dated Jul. 11, 2024.
PCT Application No. PCT/US22/54026, International Preliminary Report on Patentability dated Jul. 11, 2024.
PCT Application No. PCT/US22/54184, International Preliminary Report on Patentability dated Jul. 11, 2024.
PCT Application No. PCT/US22/54029, International Preliminary Report on Patentability dated Jul. 11, 2024.
PCT Application No. PCT/US22/54030, International Preliminary Report on Patentability dated Jul. 11, 2024.
PCT Application No. PCT/US22/54357, International Preliminary Report on Patentability dated Jul. 11, 2024.
PCT Application No. PCT/US22/54388, International Preliminary Report on Patentability dated Jul. 11, 2024.
PCT Application No. PCT/US22/54186, International Preliminary Report on Patentability dated Jul. 11, 2024.
PCT Application No. PCT/US22/54320, International Preliminary Report on Patentability dated Jul. 11, 2024.
PCT Application No. PCT/US22/54348, International Preliminary Report on Patentability dated Jul. 11, 2024.
PCT Application No. PCT/US23/12215, International Preliminary Report on Patentability dated Aug. 15, 2024.
PCT Application No. PCT/US22/52805, International Preliminary Report on Patentability dated Jun. 27, 2024.
Mesbachi et al., "Advanced Model of Hybrid Energy Storage System Integrating Lithium-Ion Battery and Supercapacitator for Electric Vehicle Applications," IEEE Transactions on Industrial Electronics, vol. 68(5): 3962-3972, May 2021.
U.S. Appl. No. 19/356,901 filed Oct. 13, 2025, John Cronin.
U.S. Appl. No. 18/088,256, Office Action dated Nov. 20, 2025.
U.S. Appl. No. 18/092,060, Office Action dated Oct. 24, 2025.

* cited by examiner

SUPERCAPACITOR TO ELECTROCHEMICAL HYBRID SYSTEM WITH SMART SELF-DISCHARGE CAPABILITY

CROSS-REFERENCE TO RELATED APPLICATIONS

This application claims the benefit of U.S. Provisional Application No. 63/295,423, filed Dec. 30, 2021, for "SUPERCAPACITOR TO ELECTROCHEMICAL HYBRID SYSTEM WITH SMART SELF-DISCHARGE CAPABILITY," the disclosure of which is incorporated herein by reference in its entirety.

TECHNICAL FIELD

The present disclosure is generally related to batteries for electric vehicles and, more particularly, to a hybrid power system for an electric vehicle incorporating supercapacitor and electrochemical batteries.

BACKGROUND

The subject matter discussed in the background section should not be assumed to be prior art merely due to its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

The number of electric vehicles (EVs) in operation has grown exponentially in recent years. Conventionally, EVs have relied on electrochemical batteries, e.g., lithium-ion and lead-acid batteries. However, electrochemical batteries suffer from a variety of disadvantages including a short shelf-life, low peak power, and a limited number of charging/discharging cycles.

More recently, supercapacitors have begun to replace lead-acid and lithium-based batteries in data storage applications requiring high current/short duration backup power. Compared to electrochemical batteries, supercapacitors provide higher peak power bursts in smaller form factors and feature longer charge cycle life over a wider range of operating temperatures.

Supercapacitors discharge faster, and have a longer lifespan, than electrochemical batteries. Some supercapacitors can be charged millions of times before they start to degrade. By contrast, electrochemical batteries, like lead-acid batteries, may only provide 500 to 1,000 charge cycles before they degrade.

There is need to enhance the performance of electric vehicles by providing the benefits of both electrochemical batteries and supercapacitors, reducing number of charging cycles of electrochemical batteries, while enabling the greater electrical charge that supercapacitors have in an electric vehicle.

SUMMARY OF THE DISCLOSURE

According to one aspect, a method for powering an electric vehicle having an electrochemical battery and one or more supercapacitor batteries includes determining self-discharge rate data for the one or more supercapacitor batteries. In response to the self-discharge rate data satisfying at least one threshold condition, the method includes notifying a user to charge the one or more supercapacitor batteries. Otherwise, the method includes measuring current within a first path connecting the electrochemical battery to the electric vehicle, storing data representing the measured current in a database, determining a current use pattern from stored current data in the database, and, in response to the current use pattern satisfying a first switching condition, disconnecting the electrochemical battery from the electric vehicle using a first switch in a first electrical path electrically coupling the electrochemical battery to the electric vehicle and connecting the one or more supercapacitor batteries to the electric vehicle using a second switch in a second electrical path electrically coupling the one or more supercapacitor batteries with the electric vehicle. In response to the current use pattern satisfying a second switching condition (or no longer satisfying the first switching condition), the method includes disconnecting the one or more supercapacitor batteries from the electric vehicle using the second switch and connecting the electrochemical battery to the electric vehicle using the first switch.

In some embodiments, the method further includes, in response to the current use pattern not satisfying the first switching condition, waiting for a self-discharge safe time before determining whether the current use pattern satisfies the second switching condition. The self-discharge safe time may be determined by a rule according to a charging level of the electrochemical battery.

In some embodiments, the self-discharge rate data comprises an instantaneous self-discharge rate between a current charge measurement and a last charge measurement, a last charge self-discharge rate between a current charge measurement and an initial charge measurement when the one or more supercapacitor batteries were last charged, and/or a long-term self-discharge rate measured between a current self-discharge rate and a self-discharge rate N charging cycles earlier, wherein N is greater than zero. In some embodiments, N is at least twenty.

In some embodiments, the self-discharge rate data and/or the current use patterns may be obtained from artificial intelligence/machine learning (AI/ML) correlations. In some embodiments, the first switching condition may be that the measured current exceeds a current threshold.

According to another aspect, a system for powering an electric vehicle including an electrochemical battery and one or more supercapacitor batteries includes at least one processor and a computer-readable medium comprising program code that, when executed by the at least one processor, cause the at least one processor to perform operations including determining self-discharge rate data for the one or more supercapacitor batteries and, in response to the self-discharge rate data satisfying at least one threshold condition, notifying a user to charge the one or more supercapacitor batteries. Otherwise, the operations may include measuring current within a first path connecting the electrochemical battery to the electric vehicle, storing data representing the measured current in a database, determining a current use pattern from stored current data in the database, and, in response to the current use pattern satisfying a first switching condition disconnecting the electrochemical battery from the electric vehicle using a first switch in a first electrical path electrically coupling the electrochemical battery to the electric vehicle and connecting the one or more supercapacitor batteries to the electric vehicle using a second switch in a second electrical path operably coupling the one or more supercapacitor batteries with the electric vehicle. In response to the current use pattern satisfying a second switching condition, the method includes disconnecting the one or more supercapacitor batteries from the electric vehicle using the second switch and connecting the electrochemical battery to the electric vehicle using the first switch.

BRIEF DESCRIPTION OF THE DRAWINGS

The accompanying drawings illustrate various embodiments of systems, methods, and other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
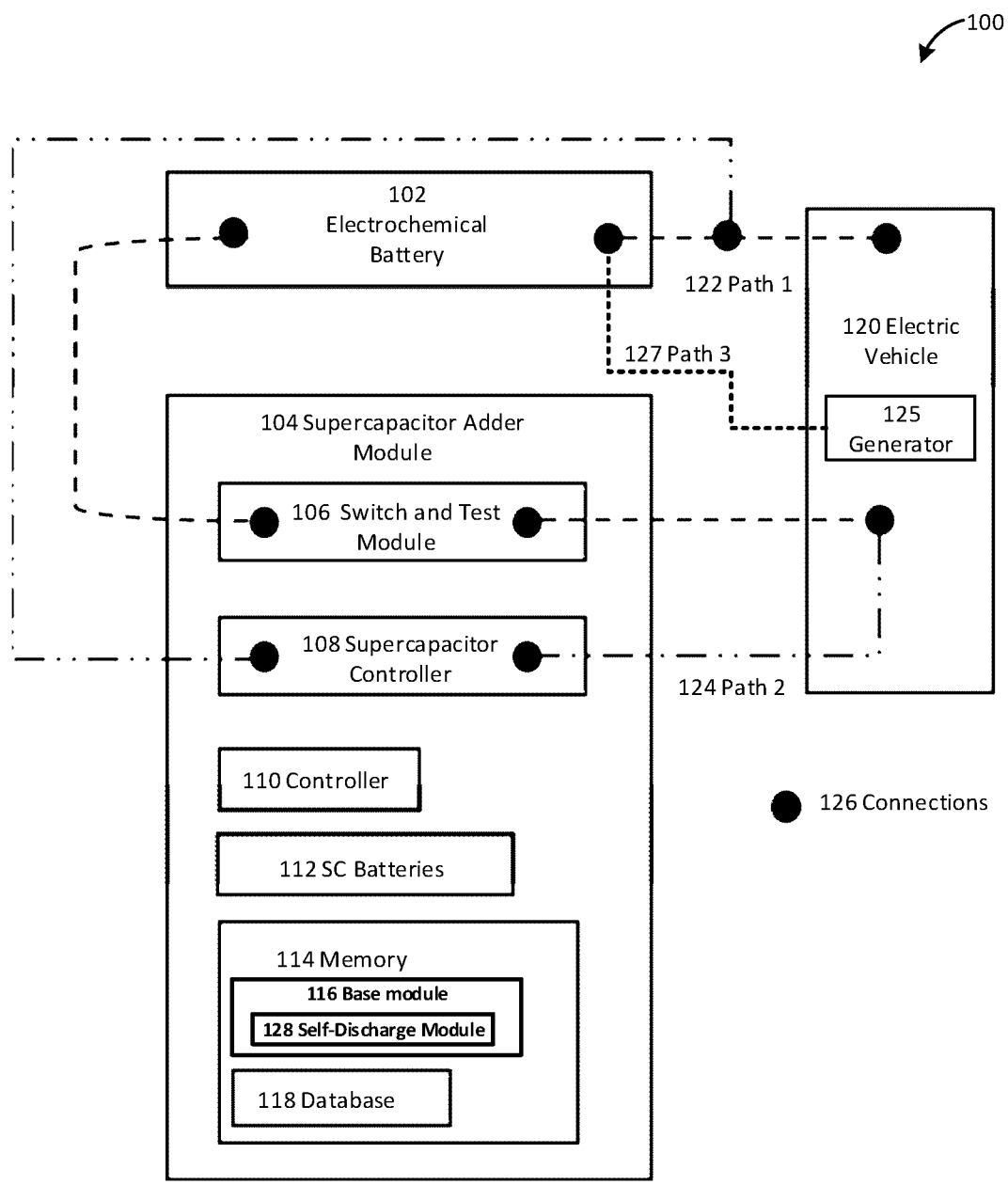
FIG. 1 is a schematic diagram of a hybrid power system for an electric vehicle according to an embodiment.

Aspects of the present invention are disclosed in the following description and related figures directed to specific embodiments of the invention. Those of ordinary skill in the art will recognize that alternate embodiments may be devised without departing from the claims' spirit or scope. Additionally, well-known elements of exemplary embodiments of the invention will not be described in detail or will be omitted so as not to obscure the relevant details of the invention.

As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the invention, embodiments, or invention do not require that all embodiments include the discussed feature, advantage, or mode of operation.

Further, many of the embodiments described herein are described in sequences of actions to be performed by, for example, elements of a computing device. It should be recognized by those skilled in the art that specific circuits can perform the various sequence of actions described herein (e.g., application-specific integrated circuits or "ASICs") and/or by program instructions executed by at least one processor. Additionally, the sequence of actions described herein can be embodied entirely within any form of computer-readable storage medium. The execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

For all ranges given herein, it should be understood that any lower limit may be combined with any upper limit when feasible. Thus, for example, citing a temperature range of from 5° C. to ° C. and from 20° C. to 200° C. would also inherently include a range of from 5° C. to 200° C. and a range of 20° C. to ° C.

When listing various aspects of the products, methods, or system described herein, it should be understood that any feature, element, or limitation of one aspect, example, or claim may be combined with any other feature, element, or limitation of any other aspect when feasible (i.e., not contradictory). Thus, disclosing an example of a power pack comprising a temperature sensor and then a different example of a power pack associated with an accelerometer would inherently disclose a power pack comprising or associated with an accelerometer and a temperature sensor.

Unless otherwise indicated, components such as software modules or other modules may be combined into a single module or component or divided. The function involves the cooperation of two or more components or modules. Identifying an operation or feature as a single discrete entity should be understood to include division or combination such that the effect of the identified component is still achieved.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used to practice or test embodiments, only some exemplary systems and methods are now described.

FIG. 1 is a schematic diagram of a hybrid power system 100 for an electric vehicle 120 according to an embodiment. The system 100 may include an electrochemical (EC) battery 102, such as a lead-acid battery or a lithium-ion battery. While the disclosure often refers to a singular electrochemical battery 102, any such reference is understood to include one or more electrochemical batteries 102. The electrochemical battery 102 may be an existing electrochemical battery 102 within the electric vehicle 120 or may be in addition to an existing electrochemical battery 102 or battery system.

The system 100 may further include a supercapacitor (SC) adder module 104, which may be embodied as a self-contained unit with various connections 126. Although four connections 126 are illustrated in FIG. 1, a person of skill in the art will recognize that more or fewer connections 126 may be provided. The supercapacitor adder module 104 may include one or more supercapacitor batteries 112 that may replace the electrochemical battery 102 under various conductions, such as when the charge level of the electrochemical battery 102 falls below a certain threshold level or when additional charge is temporarily needed. While the present disclosure often refers to the supercapacitor batteries 112 in the plural, any such reference is understood to include one or more supercapacitor batteries 112 or groups of supercapacitors or supercapacitor cells.

The supercapacitor adder module 104 may be small enough to fit into an existing battery compartment of the electric vehicle 120. The electric vehicle 120 may be any type of electric vehicle, non-limiting examples of which include automobiles, trucks, vans, fork lifts, carts (such as golf carts or baby carts), motorcycles, electric bikes scooters, autonomous vehicles, mobile robotic devices, hoverboards, monowheels, Segways®, wheelchairs, drones, personal aircraft, robotic devices, aquatic devices (such as boats, Jet Skis®, diver propulsion vehicles or underwater scooters), or the like.

Principles for the design, manufacture, and operation of supercapacitors are described, by way of example, in U.S. Pub. No. 2019/0180949, titled "Supercapacitor," published Aug. 29, 2017; U.S. Pat. No. 9,318,271, titled "High-Temperature Supercapacitor," issued Apr. 19, 2016; U.S. Pub. No. 2020/0365336, titled "Energy Storage Device," published Nov. 19, 2020; U.S. Pat. No. 9,233,860, titled "Supercapacitor and Method for Making the Same," issued Jan. 12, 2016; and U.S. Pat. No. 9,053,870, titled "Supercapacitor with a Mesoporous Nanographene Electrode," issued Jun. 9, 2015, all of which are incorporated herein by reference.

The supercapacitor batteries 112 may include any type or configuration of supercapacitor batteries or cells having enough capacity to enhance the integration of the supercapacitor adder module 104 and the electrochemical battery 102. The supercapacitor batteries 112 may be configured to have the same voltage as the electrochemical battery 102 so to easily integrate into the electric vehicle 120.

As described in greater detail below, the supercapacitor adder module 104 may also include a control system to automatically switch between the electrochemical battery 102 and the supercapacitor batteries 112 (or vice versa) when powering the electric vehicle 120. One reason to switch between electrochemical battery 102 and supercapacitor batteries 112 is when electrochemical batteries 102 falls below a certain level of charge and there is a need to have some emergency power to power the electric vehicle 120 for a time. Another reason for switching from the electrochemical battery 102 to the supercapacitor batteries 112 may be to allow the supercapacitor batteries 112 to run the electric vehicle 120 when higher amperage is desired quickly, such as when the electric vehicle 120 is moving up a steep hill or is predicted to move up the hill based on predefined or predicted route. In other examples, switching may be performed to optimize discharge, as the discharge is typically faster for the supercapacitor batteries 112 than the electrochemical battery 102. In a further example, switching from the electrochemical battery 102 to the supercapacitor batteries 112 may be done to enhance the lifespan of the electrochemical battery 102, as the supercapacitor batteries 112 can be charged millions of times before they start to degrade, whereas the electrochemical battery 102 may only allow 500 to 1,000 charging cycles.

The supercapacitor adder module 104 may be configured to easily connect to the electric vehicle 120 using standard battery connections 126 and may utilize circuitry including a first electrical path 122 and a second electrical path 124. The circuit layout of the first electrical path 122 and the second electrical path 124 is one example of how switching could occur, but there could be many others depending upon how the supercapacitor adder module 104 is designed. As illustrated in FIG. 1, the first electrical path 122 shows connections 126 between the electric vehicle 120 and electrochemical battery 102. The second electrical path 124 shows connections between electric vehicle 120 and a supercapacitor controller 108, which, in turn, is electrically coupled to the supercapacitor batteries 112 via internal circuitry (not shown). The connections 126 may be terminals (such as found in battery terminals) to connect the supercapacitor adder module 104 into the system 100. One or more of the connections 126 may include or be associated with digitally controlled, high-powered relays (e.g., switches) to open or close the first and second electrical paths 122, 124. Suitable relays are available from TE Connectivity of Schaffhausen, Switzerland, among other suppliers.

After switching, a generator 125 (e.g., alternator) of the electric vehicle 120 may recharge the electrochemical battery 102 via a third electrical path 127 that may or may not pass through the supercapacitor adder module 104. Alternatively, or in addition, the supercapacitor batteries 112 may be used to recharge the electrochemical battery 102.

In one embodiment, the supercapacitor adder module 104 further includes a switch and test module 106. The switch and test module 106 may include a current tester, which performs current (amperage) measurement in the first electrical path 122 to determine how much current is drawn through the electrochemical battery 102 and the electric vehicle 120. The switch and test module 106 may also include a current tester in the second electrical path 124 to determine how much current is drawn through the through the supercapacitor batteries 112. As explained in greater detail below, the switch and test module 106 may be instructed to disconnect or connect the electrochemical battery 102 using a digitally controlled, high-powered relay. The switch and test module 106 may operate in milliseconds, such that switching will not disrupt the smooth operation of the electric vehicle 120.

The supercapacitor adder module 104 may also include a supercapacitor controller 108 and a base module 116. As described in greater detail below, the supercapacitor controller 108 may switch between the electrochemical battery 102 and the supercapacitor batteries 112. For example, in response to being executed by the base module 116, the supercapacitor controller 108 may disconnect the first electrical path 122 by instructing the switch and test module 106 to disconnect the first electrical path 122 and to switch the supercapacitor batteries 112 onto the second electrical path 124 using one or more high-powered switching relays. While the first electrical path 122 is disconnected, the electrochemical battery 102 may still remain connected to the generator 125 via the third electrical path 127, such that the electrochemical battery 102 may be recharged while the supercapacitor batteries 112 are powering the electric vehicle 120.

The supercapacitor controller 108, when executed by the base module 116, also facilitates switching between the supercapacitor batteries 112 and the electrochemical battery 102 by disconnecting the second electrical path 124 and then instructing the switch and test module 106 to connect the first electrical path 122 allowing the electrochemical battery 102 onto the first electrical path 122 to power the electric vehicle 120.

The supercapacitor adder module 104 may include a controller 110, which may be embodied as a processor to execute instructions stored in a memory 114, such as a random-access memory or the like. The memory 114 may store the base module 116 described above, as well as various sub-modules, such as a self-discharge (SD) module 128, which is described in greater detail below.

The controller 110 may allow read/write access to a database 118, which may be stored and/or buffered by the memory 114. The controller 110 allows for current measurements from the first electrical path 122 and/or the second electrical path 124 to be collected and stored (in real-time) in the database 118. The controller 110 also provides for measuring the charge on the supercapacitor batteries 112. The controller 110 may further controls the switching of the high-powered switching relays in the first and second electrical paths 122, 124, as the base module executes 116.

The database 118 allows reading and writing data from base module 116 and its sub-modules (including the self-discharge module 128), as well as data associated with the switch and test module 106 and the supercapacitor controller 108. In one embodiment, the database 118 also stores the recommended maximum charge level for the supercapacitor batteries 112 based, for example, on manufacturer specifications. Additionally, the database 118 may store thresholds for discharge. In one embodiment, the database 118 may also store, for the supercapacitor batteries 112, an instantaneous self-discharge rate, a last charge self-discharge rate, a long-term self-discharge rate, as well as one or more predicted self-discharge rates based on artificial intelligence/machine learning (AI/ML) correlations, as described in greater detail hereafter.

The self-discharge module 128, as described with reference to FIG. 7, may execute from the base module 116. In one embodiment, the self-discharge module 128 measures the charge on the supercapacitor batteries 112. This may be done in some embodiments by measuring the voltage across the supercapacitor batteries 112 and calculating the charge Q (in coulombs) using the equation, $Q=VC$, where V is the measured voltage and C is the capacitance of the supercapacitor batteries 112. The self-discharge module 128 may also measure current flow (amperage) through the first electrical path 122 between the electrochemical battery 102 and the electric vehicle 120, as well as the second electrical path 124 between the supercapacitor batteries 112 and the electric vehicle 120. The self-discharge module 128 may store the measurements in the database 118.

Further, the self-discharge module 128 may calculate an instantaneous self-discharge rate of the supercapacitor batteries 112 between a present charge measurement and the last charge measurement and store the data in the database 118 along with a timestamp. In one embodiment, the instantaneous self-discharge rate is the difference between the last recorded charge measurement in the database 118 and the present charge measurement divided by the time interval between the measurements. As such, the instantaneous self-discharge rate could be very small if the time between the change is small. However, the instantaneous self-discharge rate could be more significant or greater than expected due to a long lapse of time or a maintenance issue with supercapacitor adder module 104. In that case, the calculated instantaneous self-discharge rate could be used to alert the user and to avoid using (or reduce the usage of) the supercapacitor batteries 112 to power the electric vehicle 120 and/or charge the electrochemical battery 102.

In addition, the self-discharge module 128 may calculate a last charge self-discharge rate of the supercapacitor batteries 112 from the initial measurement after charging to the present measurement and store the data in the database 118 with a time stamp. The last charge self-discharge rate is the difference between the last recorded charge measurement when the supercapacitor batteries 112 were last charged and the present charge measurement divided by the time interval between the measurements. The last charge self-discharge rate could be minimal if the time between the measurements is small. However, if the last charge self-discharge rate is more significant due to a long lapse of time or a maintenance issue with supercapacitor adder module 104, the calculated last charge self-discharge rate may be used to alert the user and to avoid using (or reduce the usage of) the supercapacitor batteries 112.

In addition, the self-discharge module 128 may calculate a long-term self-discharge rate of supercapacitor batteries 112 and store the data in the database 118 along with the timestamp. The long-term self-discharge rate is the calculated self-discharge rate that has been seen between the current measurement and an earlier measurement N charging cycles earlier, where N is greater than zero. In some embodiments, N is at least twenty. The change in the long-term self-discharge rate could be minimal if the supercapacitor batteries 112 are stable. However, if the change in the long-term self-discharge rate is more significant due to a long lapse of time or some maintenance issue with supercapacitor adder module 104, the calculated long-term self-discharge rate could be used to alert the user and to avoid using the supercapacitor batteries 112.

Further, the self-discharge module 128 may predict a self-discharge rate for the supercapacitor batteries 112 using AI/ML correlations and store the data and a timestamp in the database 118. For example, all the self-discharge rates calculated thus far have been stored in database 118. An AI/ML correlation algorithm (described in greater detail with reference to FIG. 5) may be used to calculate self-discharge patterns over time for the specific supercapacitor batteries 112 in the electric vehicle 120 and/or generally for supercapacitor batteries 112 of the same type. For instance, the AI/ML correlation may show that the instantaneous self-discharge rate, the last charge self-discharge rate, and/or the long-term self-discharge rate have been consistent and, over time, slowly degrading based on the AI/ML correlation algorithm, which would be expected and not need to be reported to the user nor impact the swapping between the supercapacitor batteries 112 and the electrochemical battery 102. However, the AI/ML correlation may show that the instantaneous self-discharge rate, the last charge self-discharge rate, and/or the long-term self-discharge rate have been inconsistent and/or severely degrading over time based on the AI/ML correlation algorithm, and this may be used to alert the user and to avoid using the supercapacitor batteries 112.

Figure 2:
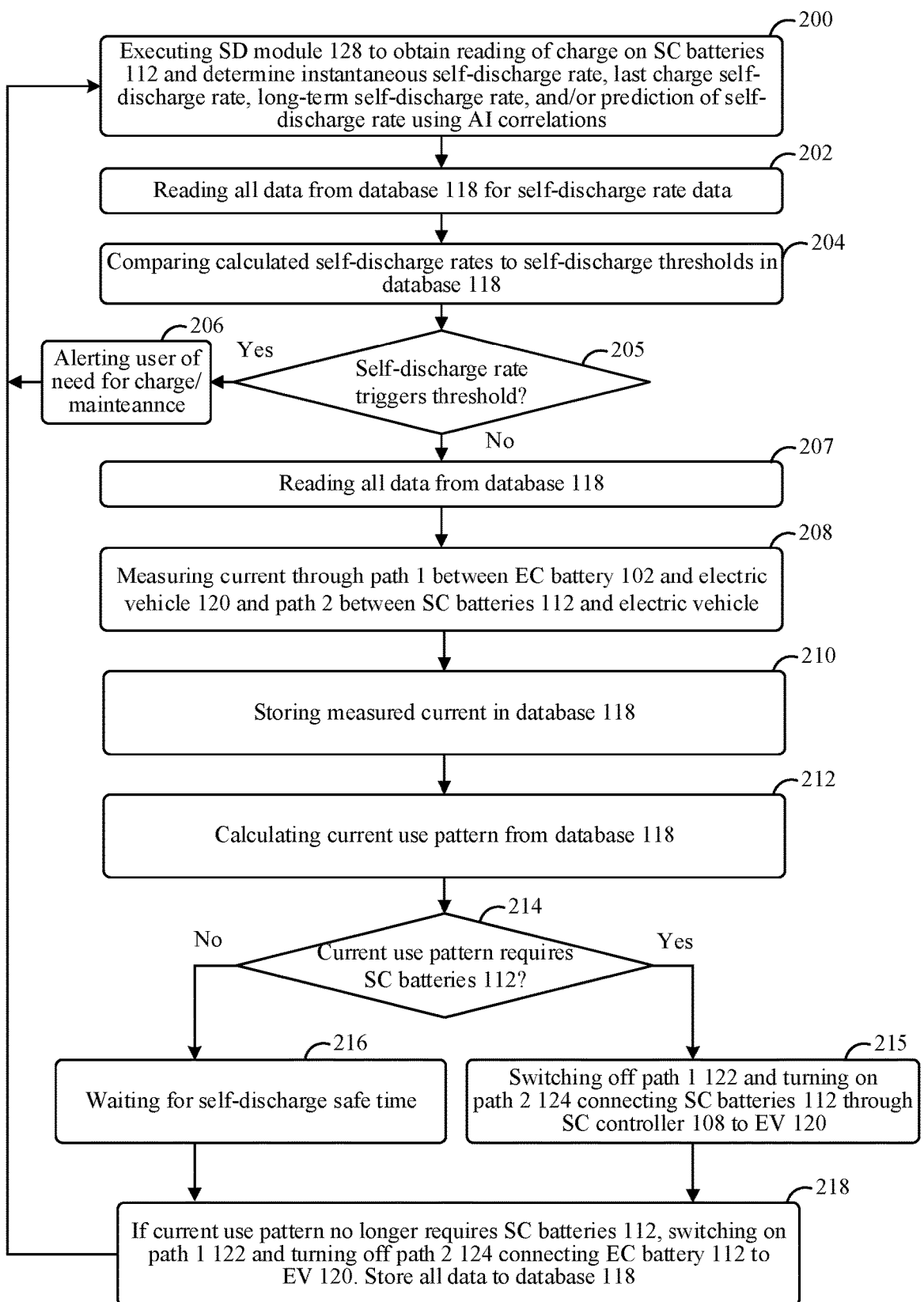
FIG. 2 is a flowchart of a method performed by a base module according to an embodiment.

FIG. 2 is a flow chart of method performed by the base module 116. One skilled in the art will appreciate that, for this and other processes and methods disclosed herein, the functions performed in the processes and methods may be implemented in differing order. Furthermore, the outlined steps and operations are only provided as examples. Some of the steps and operations may be optional, combined into fewer steps and operations, or expanded into additional steps and operations without detracting from the essence of the disclosed embodiments.

At step 200, the base module 116 executes the self-discharge module 128 to obtain a measurement of the charge on the supercapacitor batteries 112 (e.g., by measuring the voltage), as well as one or more calculated self-discharge rates, such as the instantaneous self-discharge rate, last charge self-discharge rate, long-term self-discharge rate, and/or a prediction of the self-discharge rate using AI/ML correlations.

At step 202, the base module 116 reads the database 118 for the self-discharge rate data. At step 204, the base module 116 compares the self-discharge rates to one or more stored self-discharge thresholds in the database 118. At step 205, a determination is made if any self-discharge rates trigger (e.g., reach, exceed, drop below) one or more of the self-discharge thresholds. If so, the method proceeds to step 206, where the user is alerted for the need to charge and/or seek maintenance for the supercapacitor batteries 112. Otherwise, the method proceeds with steps 207-214 to determine whether the supercapacitor batteries 112 are needed to assist the electrochemical battery 102. Alerts to the user may be facilitated through a light panel interface on the supercapacitor adder module 104 or a user interface of the electric vehicle 120, and/or sent via Wi-Fi or cellular radio in the supercapacitor adder module 104 to a mobile user device (via email, text, and/or a notification in a custom application).

At step 207, the base module 116 reads all data from database 118. At step 208, the switch and test module 106, under control of the base module 116, measures the current (amperage) passing through the first electrical path 122 (either inline or via a digital clamp meter) between the electrochemical battery 102 and the electric vehicle 120, as well as the current passing through the second electrical path 124 between the supercapacitor batteries 112 and the electric vehicle 120 when the electric vehicle 120 is running. At step 210, the base module 116 stores the measured current data in the database 118.

At step 212, the base module 116 then calculates a current use pattern from stored current data in the database 118. The current use pattern for the electrochemical battery 102 may be the average amps used per second, per hour, or another time interval. In some embodiments, the current use pattern of the electrochemical battery 102 could be the current over time and/or compared to a threshold value or the current use pattern of a historical electrochemical battery 102 previously stored in the database 118. In some embodiments, the current use pattern may be determined from AI/ML correlations, as described with reference to FIG. 5. One or more switching thresholds may be prestored in the database 118, such that if the current use pattern triggers (e.g., meets, exceeds, or drops below) a switching threshold, the supercapacitor batteries 112 are switched in to replace and/or supplement the electrochemical battery 102.

At step 214, a determination is made if the current use pattern requires supercapacitor batteries 112 (i.e., triggers a first switching threshold or condition), and no self-discharge threshold has been triggered. If so, the method proceeds to step 215, where the base module 116 instructs the supercapacitor controller 108 to switch off the first electrical path 122 and turn on the second electrical path 124 connecting the supercapacitor batteries 112 through supercapacitor controller 108 to the electric vehicle 120. Otherwise, the method proceeds to step 216, where the base module 116 waits for a self-discharge safe time before proceeding to step 218. The self-discharge safe time is a period that the electrochemical battery 102 will not likely need supercapacitor batteries 112 to assist with charge. In some embodiments, the self-discharge safe time may be precalculated and retrieved from the database 118. In other embodiments, the calculation of the self-discharge safe time may be rule based and depend on the charge of the electrochemical battery 102, where one or more rules are prestored in the database 118. A rule may include, for example, if the electrochemical battery 102 has greater than 80% charge, wait one hour. The calculation could be as simple as a short period, such as 10 minutes, where, in most cases, greater than 30% charge of the electrochemical battery 102 remains, in which case the electrochemical battery 102 does not likely need additional charge from the supercapacitor batteries 112. In some embodiments, no self-discharge safe time is provided, in which case the method proceeds directly to step 218.

At step 218, if the current use pattern no longer requires supercapacitor batteries 112 (the current use pattern satisfies a second switching threshold or condition and/or no longer satisfies the first switching threshold or condition), the base module 116 instructs the supercapacitor controller 108 to switch on the first electrical path 122 and turn off the second electrical path 124, disconnecting the supercapacitor batteries 112 from the electric vehicle 120 and reconnecting the electrochemical battery 102. The base module 116 may store all data to the database 118 before looping to step 200.

Figure 3:
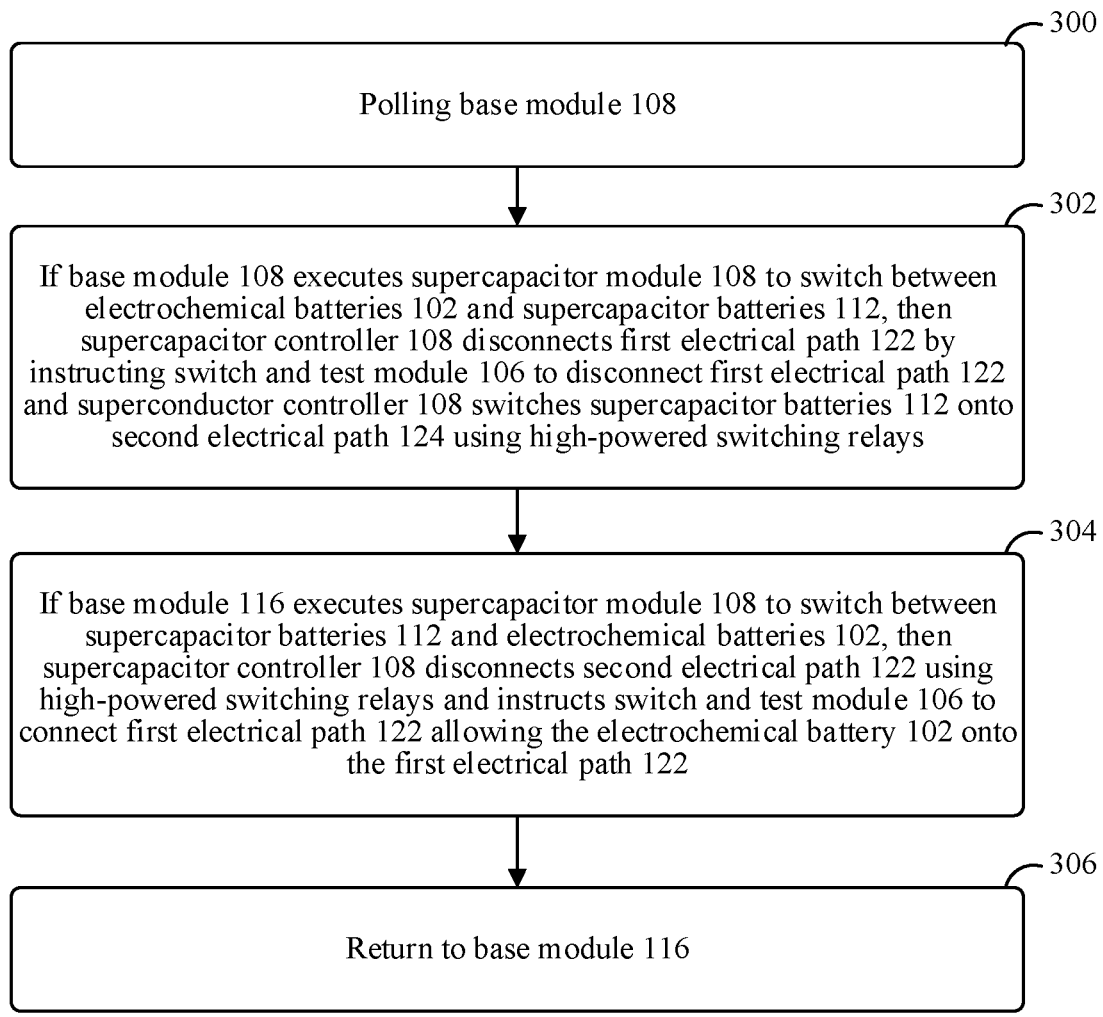
FIG. 3 is a flowchart of a method performed by a supercapacitor controller according to an embodiment.

FIG. 3 is a flowchart of a method performed by the supercapacitor controller 108 in an embodiment. Those skilled in the art will appreciate that, for this and other processes and methods disclosed herein, the functions performed in the processes and methods may be implemented in a differing order. Furthermore, the outlined steps and operations are only provided as examples. Some of the steps and operations may be optional, combined into fewer steps and operations, or expanded into additional steps and operations without detracting from the essence of the disclosed embodiments.

The process begins with the supercapacitor controller 108 polling the base module 116 at step 300. At step 302, if the supercapacitor controller 108 determines whether the base module 116 executes the supercapacitor controller 108 to switch between the electrochemical battery 102 and the supercapacitor batteries 112. If so, the supercapacitor controller 108 disconnects the first electrical path 122 by instructing the switch and test module 106 to disconnect the first electrical path 122 via the high-powered switching relay and the supercapacitor controller 108 switches the supercapacitor batteries 112 onto the second electrical path 124 using the high-powered switching relays so that the electric vehicle 120 is powered by the supercapacitor batteries 112.

At step 304, if the supercapacitor controller 108 determines whether the base module 116 executes the supercapacitor controller 108 to switch between the supercapacitor batteries 112 and the electrochemical battery 102. If so, the supercapacitor controller 108 disconnects the second electrical path 124 using a high-powered switching relay and then instructs the switch and test module 106 to connect the first electrical path 122 via a high-powered switching relay. This allows the electrochemical battery 102 onto the first electrical path 122 so that electric vehicle 120 is powered by the electrochemical battery 102. The supercapacitor controller 108 then returns control to the base module 116 at step 306.

Figure 4:
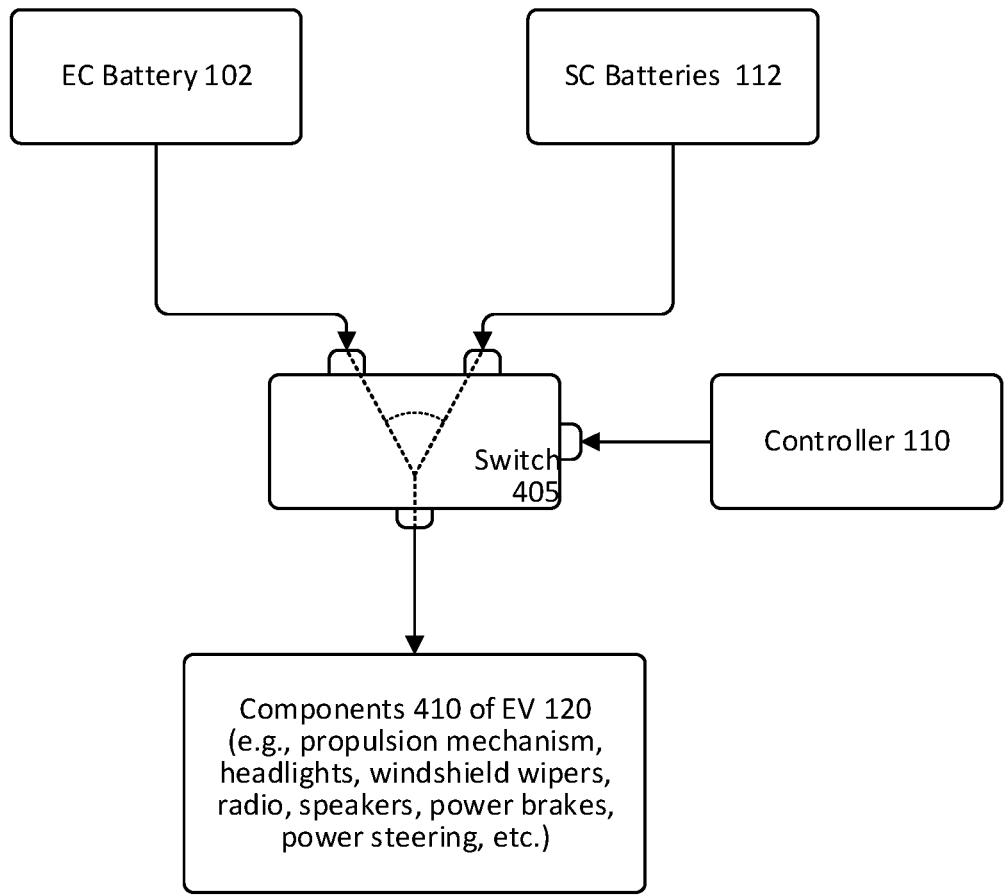
FIG. 4 is a block diagram illustrating a switch controlled by controller that toggles between a first configuration in which components draw power from an electrochemical battery and a second configuration in which the components draw power from a supercapacitor battery according to an embodiment.

FIG. 4 is a block diagram illustrating a switch 405 controlled, for example, by the controller 110 of FIG. 1 that toggles between a first configuration in which components 410 draw power from an electrochemical battery 102 and a second configuration in which the components 410 draw power from supercapacitor batteries 112. The components 410 are components of an electric vehicle 120, such as a propulsion mechanism (e.g., engine and/or motor and/or other actuator), headlights, windshield wipers, radio, speakers, power brakes, power steering, display, camera, sensors, and the like. The first configuration is illustrated by a dashed line to the left, connecting the electrochemical battery 102 to the components 410, and disconnecting the supercapacitor batteries 112 from the components 410. The second configuration is illustrated by a dashed line to the right, connecting the supercapacitor batteries 112 to the components 410, and disconnecting the electrochemical battery 102 from the components 410. The toggling of the switch 405 between the two configurations can be controlled by the controller 110 shown in FIG. 1. The switch 405 can be a mechanical switch, a Single Pole Single Throw (SPST) switch, a Single Pole Double Throw (SPDT) switch, a Double Pole Single Throw (DPST) switch, a Double Pole Double Throw (DPDT) switch, a toggle switch, a transistor switch, an NPN transistor switch, a PNP transistor switch, an H-bridge switch, an electromagnetic relay, a solid state relay, or a combination thereof.

Figure 5:
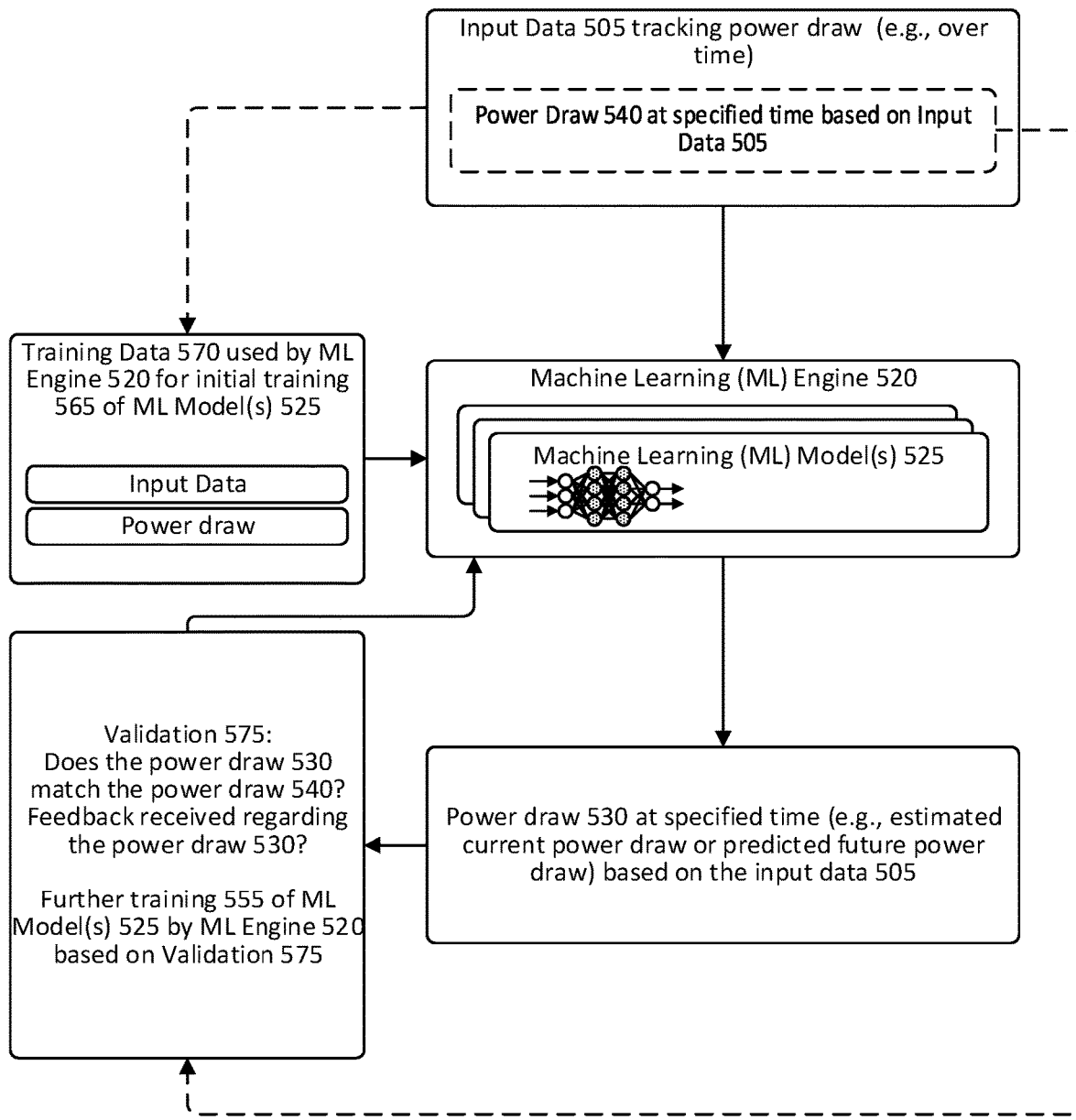
FIG. 5 is a block diagram illustrating use of one or more trained machine learning models of a machine learning engine to identify a power draw, for instance, to estimate a current power draw or predict a future power draw according to an embodiment.

FIG. 5 is a block diagram 500 illustrating use of one or more trained machine learning models 525 of a machine learning engine 520 to identify a power draw 530 to estimate a current power draw, predict a future power draw, determine the current usage pattern and/or predict a self-discharge rate, as described above. The ML engine 520 and/or the ML model(s) 525 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 5, a graphic representing the trained ML model(s) 525 illustrates a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 520 and/or the ML model(s) 525 can be part of the AI/ML module 182.

Once trained via initial training 565, the one or more ML models 525 receive, as an input, input data 505 that identifies power draw by various components and/or subsystems of a system (e.g., of the electric vehicle 120), for instance tracking power draw by various components and/or subsystems of the system (e.g., of the electric vehicle 120) over time. In some examples, the input data 505 identifies attribute(s) of charging and/or discharging of the electrochemical battery 102 and/or the supercapacitor batteries 112 (e.g., type, voltage, discharge curve, capacitance, impedance, current, amperage, capacity, energy density, specific energy density, power density, temperature, temperature dependence, service life, physical attributes, charge cycle, discharge cycle, cycle life, deep discharge ability, discharge rate, charge rate, and the like), attribute(s) of the components and/or subsystems of the system that draw charge from the electrochemical battery 102 and/or the supercapacitor batteries 112, attribute(s) of the system that includes the electrochemical battery 102 and/or the supercapacitor batteries 112 and draws charge from the electrochemical battery 102 and/or the supercapacitor batteries 112 (e.g., mileage, efficiency, ergonomics, aerodynamics, shape, geometry, weight, horsepower, brake power, turning radius, type, size, energy consumption rate, location, speed, velocity, acceleration, deceleration, turning radius, and the like), or a combination thereof.

At least some of the input data 505 may be received from one or more sensors, such as sensors to measure voltage, current, resistance, capacitance, inductance, frequency, power, temperature, continuity, location, motion, acceleration, deceleration, orientation, changes to any of these attributes, or a combination thereof. In some examples, the one or more sensors can include one or more voltmeters, ammeters, ohmmeters, coulombmeter, inductance meters, wattmeters, thermometers, thermistors, multimeters, accelerometers, gyrometers, gyroscopes, global navigation satellite system (GNSS) receivers, inertial measurement units (IMUs), or a combination thereof. In some examples, the input data 505 may be received from a one or more databases, such as the database 118, where at least some of the input data 505 may be stored after measurement by the sensors. In some examples, the input data 505 can also include information that is indicative of total capacity of the electrochemical battery 102 and/or the supercapacitor batteries 112, the remaining charge and/or remaining capacity of the electrochemical battery 102 and/or the supercapacitor batteries 112, a level of shade or shadows that could prevent solar cells from generating charge from light (e.g., whether or not shade or shadows are blocking solar cells to prevent solar charging), a route of the vehicle, a schedule trip of the vehicle, elevation data indicative of uphill and/or downhill portions of a route of the vehicle, or a combination thereof. In some examples, for instance during validation 575, the ML engine 520 and/or the one or more ML models 525 can also receive, as an additional input, a predetermined power draw 540 (e.g., current power draw or predicted future power draw)that is based on (or otherwise corresponds to) the input data 505. In response to receiving at least the input data 505 as an input(s), the one or more ML model(s) 525 estimate the power draw 530 (e.g., current power draw or predicted future power draw) based on the input data 505. The power draw 530 (e.g., current power draw or predicted future power draw) can indicate an amount of power drawn, a rate at which power is drawn, and the like. The power draw can be indicated in terms of voltage, current, resistance, capacitance, inductance, frequency, power, amperage, capacity, energy density, specific energy density, power density, charge cycle, discharge cycle, cycle life, deep discharge ability, discharge rate, charge rate, or a combination thereof. The power draw can be indicated in units of watts, amps, volts, ohms, joules, farads, henries, any of the previously-listed units measured per distance or area (e.g., per meter or per meter squared), any of the previously-listed units measured per unit of time (e.g., per second or per second squared), or a combination thereof.

Once the one or more ML models 525 identify the power draw 530, the power draw 530 can be output to an output interface that can indicate the power draw 530 to a user (e.g., by displaying the power draw 530 or playing audio indicative of the power draw 530) and/or to the hybrid power system 100 which can adjust settings and/or configurations for the hybrid power system 100, for instance to switch between a first configuration in which components and/or subsystems (e.g., the propulsion system of the vehicle) draw power from an electrochemical battery (and disconnects a supercapacitor from providing power to those components and/or subsystems) and a second configuration in which the components and/or subsystems (e.g., the propulsion system of the vehicle) draw power from an supercapacitor (and disconnects the electrochemical battery from providing power to those components and/or subsystems).

Before using the one or more ML models 525 to identify the power draw 530 the ML engine 520 performs initial training 565 of the one or more ML models 525 using training data 570. The training data 570 can include examples of input data tracking power draw over time (e.g., as in the input data 505) and/or examples of a pre-determined power draw (e.g., as in the pre-determined power draw 540). In some examples, the pre-determined power draw in the training data 570 are power draw(s) that the one or more ML models 525 previously identified based on the input data in the training data 570. In the initial training 565, the ML engine 520 can form connections and/or weights based on the training data 570, for instance between nodes of a neural network or another form of neural network. For instance, in the initial training 565, the ML engine 520 can be trained to output the pre-determined power draw in the training data 570 in response to receipt of the corresponding input data in the training data 570.

During a validation 575 of the initial training 565 (and/or further training 555), the input data 505 (and/or the exemplary input data in the training data 570) is input into the one or more ML models 525 to identify the power draw 530 as described above. The ML engine 520 performs validation 575 at least in part by determining whether the identified power draw 530 matches the pre-determined power draw 540 (and/or the pre-determined power draw in the training data 570). If the power draw 530 matches the pre-determined power draw 540 during validation 575, then the ML engine 520 performs further training 555 of the one or more ML models 525 by updating the one or more ML models 525 to reinforce weights and/or connections within the one or more ML models 525 that contributed to the identification of the power draw 530, encouraging the one or more ML models 525 to make similar power draw determinations given similar inputs. If the power draw 530 does not match the pre-determined power draw 540 during validation 575, then the ML engine 520 performs further training 555 of the one or more ML models 525 by updating the one or more ML models 525 to weaken, remove, and/or replace weights and/or connections within the one or more ML models that contributed to the identification of the power draw 530, discouraging the one or more ML models 525 from making similar power draw determinations given similar inputs.

Validation 575 and further training 555 of the one or more ML models 525 can continue once the one or more ML models 525 are in use based on feedback 550 received regarding the power draw 530. In some examples, the feedback 550 can be received from a user via a user interface, for instance via an input from the user interface that approves or declines use of the power draw 530 for charging. In some examples, the feedback 550 can be received from another component or subsystem of the hybrid power system 100, for instance based on whether the component or subsystem successfully uses the power draw 530, whether use the power draw 530 causes any problems for the component or subsystem (e.g., which may be detected using the sensors), whether use the power draw 530 are accurate, or a combination thereof. If the feedback 550 is positive (e.g., expresses, indicates, and/or suggests approval of the power draw 530, success of the power draw 530, and/or accuracy the power draw 530), then the ML engine 520 performs further training 555 of the one or more ML models 525 by updating the one or more ML models 525 to reinforce weights and/or connections within the one or more ML models 525 that contributed to the identification of the power draw 530, encouraging the one or more ML models 525 to make similar power draw determinations given similar inputs. If the feedback 550 is negative (e.g., expresses, indicates, and/or suggests disapproval of the power draw 530, failure of the power draw 530, and/or inaccuracy of the power draw 530) then the ML engine 520 performs further training 555 of the one or more ML models 525 by updating the one or more ML models 525 to weaken, remove, and/or replace weights and/or connections within the one or more ML models that contributed to the identification of the power draw 530, discouraging the one or more ML models 525 to make similar power draw determinations given similar inputs.

Figure 6:
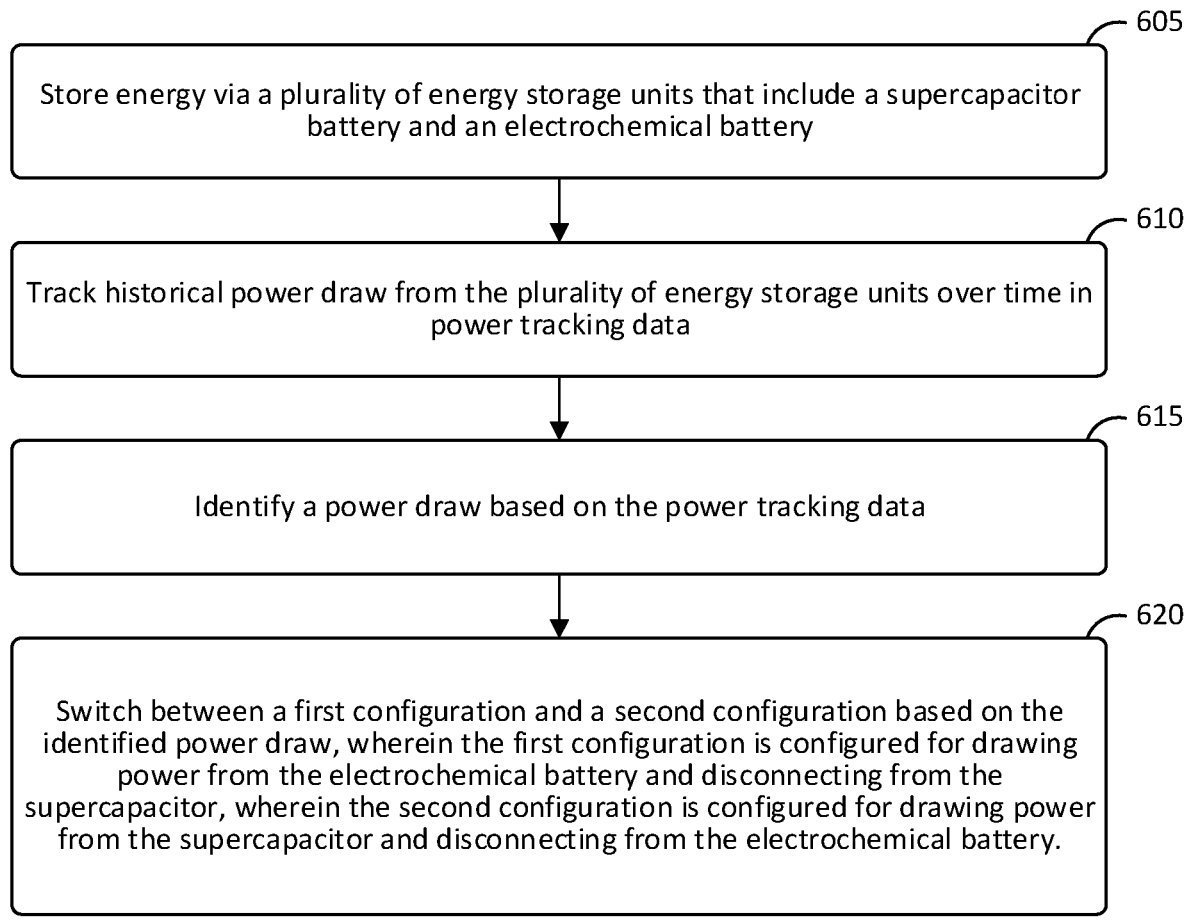
FIG. 6 is a flow chart illustrating a process for energy management performed using a control system according to an embodiment.

FIG. 6 is a flow diagram illustrating a method 600 for energy management. The components that perform the method 600 (or any of the methods disclosed herein) can include the hybrid power system 100, the electrochemical battery 102, the supercapacitor adder module 104, the switch and test module 106, the self-discharge module 128, the supercapacitor controller 108, the controller 110, the supercapacitor batteries 112, the memory 114, the base module 116, the database 118, electric vehicle 120, any system(s) that perform any of the processes of any of the preceding figures, the switch 405, the components 410, the ML engine 520 of FIG. 5, an apparatus, a non-transitory computer-readable storage medium coupled to a processor, component(s) or subsystem(s) of any of these systems, and/or a combination thereof.

At operation 605, the controller is configured to, and can, store energy via a plurality of energy storage units that include a supercapacitor and an electrochemical battery. At operation 610, the controller is configured to, and can, track historical power draw from a plurality of energy storage units, such as the electrochemical battery 102 and/or supercapacitor batteries 112, over time in power tracking data.

In some examples, the controller includes a charge management database that is configured to store the power tracking data that tracks the historical power draw from the plurality of energy storage units over time.

At operation 615, the controller is configured to, and can, identify a power draw based on the power tracking data.

In some examples, the controller is configured to, and can, add (e.g., using the supercapacitor adder module 104) a plurality of power draw values corresponding to a plurality of components that are configured to draw power (e.g., a propulsion mechanism, a set of headlights, a set of windshield wipers, a radio, a set of speakers, a display, a navigation system, a power steering system, a powered brake system, and the like) to identify the power draw based on the power tracking data. In some examples, the controller 110 is configured to, and can, identify the plurality of power draw values corresponding to the plurality of components based on the power tracking data (e.g., as measured by sensor(s) and/or stored in the database 118). In some examples, the power tracking data can track the power draw values for each of the components over time. In some examples, the power tracking data can track the total power draw of all of the components over time. In some examples, the controller 110 is configured to, and can, identify the plurality of power draw values corresponding to the plurality of components based on one or more measurements from one or more sensors.

In some examples, the controller 110 is configured to, and can, input the power tracking data (e.g., as part of the input data 505) into a trained machine learning model (e.g., the ML model(s) 525) to identify the power draw (e.g., as power draw 530). In some examples, the controller 110 is configured to, and can, also input information tracking charging of the plurality of energy storage units over time, and/or usage of the different components of the vehicle over time (e.g., as another part of the input data 505), into the trained machine learning model to identify the power draw. In some examples, the controller 110 is configured to, and can, use the identified power draw (e.g., the power draw 530) as training data to update the trained machine learning model (e.g., as in the further training 555 and/or the initial training 565).

At operation 620, the controller 110 is configured to, and can, switch between a first configuration and a second configuration based on the identified power draw. The first configuration is configured for drawing power from the electrochemical battery 102 and disconnecting from the supercapacitor batteries 112. The second configuration is configured for drawing power from the supercapacitor batteries 112 and disconnecting from the electrochemical battery 102.

In some examples, to switch between the first configuration and the second configuration, the controller 110 is configured to switch from the first configuration to the second configuration based on the identified power draw exceeding a threshold power draw. For instance, because the supercapacitor batteries 112 can provide power at a faster rate than the electrochemical battery 102, if power needs to be provided at a rate that exceeds the threshold power draw, the controller 110 can switch to the second configuration that draws power from the supercapacitor batteries 112 rather than the electrochemical battery 102.

In some examples, to switch between the first configuration and the second configuration, the controller 110 is configured to switch from the second configuration to the first configuration based on the identified power draw falling below a threshold power draw. For instance, if power no longer needs to be provided at a rate that exceeds the threshold power draw, the controller 110 can switch to the first configuration that draws power from the electrochemical battery 102 rather than the supercapacitor batteries 112, as the electrochemical battery 102 can provide more steady power more efficiently than the supercapacitor batteries 112. By switching between the two, the controller 110 can provide the benefits of both the supercapacitor batteries 112 and the electrochemical battery 102 while mitigating the downsides of both the supercapacitor batteries 112 and the electrochemical battery 102.

In some examples, the controller 110 is configured to, and can, provide the power draw from at least one of the plurality of energy storage units after switching between the first configuration and the second configuration.

In some examples, the controller 110 includes a switch (e.g., of the switch and test module 106). To switch between the first configuration and the second configuration, the controller 110 can toggle the switch, wherein a first contact of the switch is coupled to one or more components that draw charge from one or more of the plurality of energy storage units, wherein a second contact of the switch is coupled to the electrochemical battery in the first configuration, wherein the second contact of the switch is coupled to the supercapacitor in the second configuration. In some examples, to switch between the two configurations, the controller 110 can toggle the switch between two paths for electricity to flow, such as the first electrical path 122 and the second electrical path 124.

In some examples, the controller 110 includes an output interface that is configured to, and can, output an indication of the power draw, and/or output an indication of a current configuration after the switching of operation 620 (the current configuration being the first configuration, the second configuration, or a third configuration not previously discussed).

Figure 7:
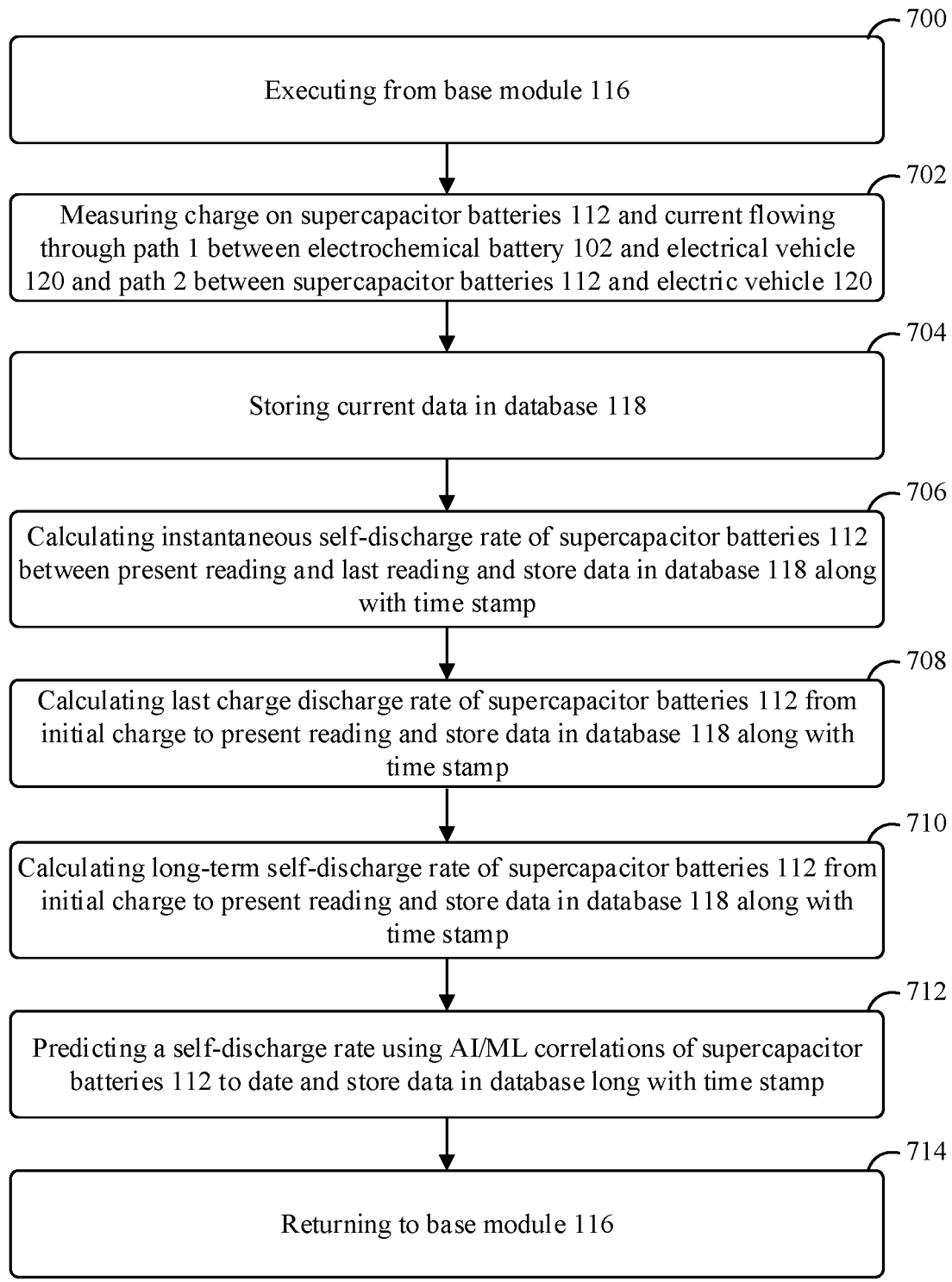
FIG. 7 is a flowchart of a method performed by a self-discharge module according to an embodiment.

FIG. 7 is flowchart of a method performed by the self-discharge module 128. One skilled in the art will appreciate that, for this and other processes and methods disclosed herein, the functions performed in the processes and methods may be implemented in differing order. Furthermore, the outlined steps and operations are only provided as examples. Some of the steps and operations may be optional, combined into fewer steps and operations, or expanded into additional steps and operations without detracting from the essence of the disclosed embodiments.

At step 700, the process begins with the self-discharge module 128 executing from the base module 116. At step 702, the self-discharge module 128 measures the charge on the supercapacitor batteries 112, as well as (in some embodiments) the current/amperage flowing through the first electrical path between the electrochemical battery 102 and the electric vehicle 120 and through the second electrical path between the supercapacitor batteries 112 and the electric vehicle 120. At step 704, the self-discharge module 128 stores the measured data in the database 118.

At step 706, the self-discharge module 128 calculates the instantaneous self-discharge rate of the supercapacitor batteries 112 between the current measurement and the last measurement and stores the data in the database 118 with a timestamp. At step 708, the self-discharge module 128 calculates the last charge self-discharge rate of the supercapacitor batteries 112 from the initial charge to the present measurement and stores the data in the database 118 with a time stamp. At step 710, the self-discharge module 128 may calculate the long-term self-discharge rate of the supercapacitor batteries 112 from the earlier charge (e.g., more than twenty charges prior) to the present measurement, storing the data in the database 118 along with a timestamp.

At step 712, the self-discharge module 128 may determine a predicted self-discharge rate of the supercapacitor batteries 112 to date using AI/ML correlations and store the prediction with a timestamp in the database 118. For example, all the self-discharges calculated have been stored in database 118. The AI/ML correlation algorithm (described with reference to FIG. 5) may be used to calculate discharge patterns over time. For instance, the AI/ML correlation may show that the instantaneous self-discharge rate, last charge self-discharge rate, and/or long-term self-discharge rate have been consistent and, over time, slowly degrading, which would be expected and not need to be reported to the user nor impact the swapping between the electrochemical battery 102 and the supercapacitor batteries 112. However, the AI/ML correlation may show that the instantaneous self-discharge rate, the last charge self-discharge rate, and/or the long-term self-discharge rate have been very inconsistent and severely degrading over time, in which case the user should be notified. The self-discharge module 128 returns to the base module 116 at step 714.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Aspects of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, aspects of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method for powering an electric vehicle including an electrochemical battery and one or more supercapacitor batteries, the method comprising:
   determining self-discharge rate data for the one or more supercapacitor batteries; and
   in response to the self-discharge rate data satisfying at least one threshold condition, notifying a user to charge the one or more supercapacitor batteries, otherwise performing operations including:
      measuring current within a first path connecting the electrochemical battery to the electric vehicle;
      storing data representing the measured current in a database;
      determining a current use pattern from stored current data in the database;
      in response to the current use pattern satisfying a first switching condition:
         disconnecting the electrochemical battery from the electric vehicle using a first switch in a first electrical path electrically coupling the electrochemical battery to the electric vehicle; and
         connecting the one or more supercapacitor batteries to the electric vehicle using a second switch in a second electrical path electrically coupling the one or more supercapacitor batteries with the electric vehicle; and
      in response to the current use pattern satisfying a second switching condition:
         disconnecting the one or more supercapacitor batteries from the electric vehicle using the second switch; and
         connecting the electrochemical battery to the electric vehicle using the first switch.

2. The method of claim 1, further comprising:
   in response to the current use pattern not satisfying the first switching condition, waiting for a self-discharge safe time before determining whether the current use pattern satisfies the second switching condition.

3. The method of claim 2, wherein the self-discharge safe time is determined by a rule according to a charging level of the electrochemical battery.

4. The method of claim 1, wherein the self-discharge rate data comprises an instantaneous self-discharge rate between a current charge measurement and a last charge measurement.

5. The method of claim 1, wherein the self-discharge rate data comprises a last charge self-discharge rate between a current charge measurement and an initial charge measurement when the one or more supercapacitor batteries were last charged.

6. The method of claim 5, wherein N is at least twenty.

7. The method of claim 1, wherein the self-discharge rate data comprises a long-term self-discharge rate measured between a current self-discharge rate and a self-discharge rate N charging cycles earlier, wherein N is greater than zero.

8. The method of claim 1, wherein the self-discharge rate data comprises a predicted self-discharge rate obtained from artificial intelligence/machine learning (AI/ML) correlations.

9. The method of claim 1, wherein the current use pattern is obtained from artificial intelligence/machine learning (AI/ML) correlations.

10. The method of claim 1, wherein the first switching condition comprises the measured current exceeding a current threshold.

11. A system for powering an electric vehicle including an electrochemical battery and one or more supercapacitor batteries, the system comprising:
   at least one processor; and
   a computer-readable medium comprising program code that, when executed by the at least one processor, cause the at least one processor to perform operations including:
      determining self-discharge rate data for the one or more supercapacitor; and
      in response to the self-discharge rate data satisfying at least one threshold condition, notifying a user to charge the one or more supercapacitor batteries, otherwise performing operations including:
         measuring current within a first path connecting the electrochemical battery to the electric vehicle;
         storing data representing the measured current in a database;
         determining a current use pattern from stored current data in the database;
         in response to the current use pattern satisfying a first switching condition:
            disconnecting the electrochemical battery from the electric vehicle using a first switch in a first electrical path electrically coupling the electrochemical battery to the electric vehicle; and connecting the one or more supercapacitor batteries to the electric vehicle using a second switch in a second electrical path operably coupling the one or more supercapacitor batteries with the electric vehicle; and in response to the current use pattern satisfying a second switching condition:
disconnecting the one or more supercapacitor batteries from the electric vehicle using the second switch; and
connecting the electrochemical battery to the electric vehicle using the first switch.

12. The system of claim 11, wherein the operations further comprise:
in response to the current use pattern not satisfying the first switching condition, waiting for a self-discharge safe time before determining whether the current use pattern satisfies the second switching condition.

13. The system of claim 12, wherein the self-discharge safe time is determined by a rule according to a charging level of the electrochemical battery.

14. The system of claim 11, wherein the self-discharge rate data comprises an instantaneous self-discharge rate between a current charge measurement and a last charge measurement.

15. The system of claim 11, wherein the self-discharge rate data comprises a last charge self-discharge rate between a current charge measurement and an initial charge measurement when the one or more supercapacitor batteries were last charged.

16. The system of claim 15, wherein N is at least twenty.

17. The system of claim 11, wherein the self-discharge rate data comprises a long-term self-discharge rate measured between a current self-discharge rate and a self-discharge rate N charging cycles earlier, wherein N is greater than zero.

18. The system of claim 11, wherein the self-discharge rate data comprises a predicted self-discharge rate obtained from artificial intelligence/machine learning (AI/ML) correlations.

19. The system of claim 11, wherein the current use pattern is obtained from artificial intelligence/machine learning (AI/ML) correlations.

20. The system of claim 11, wherein the first switching condition comprises the measured current exceeding a current threshold.

* * * * *